United States Patent
Korst et al.

Patent Number: 5,950,015
Date of Patent: Sep. 7, 1999

[54] METHOD AND SYSTEM FOR READING DATA FOR A NUMBER OF USERS

[75] Inventors: Johannes H. M. Korst; Serverius P. P. Pronk, both of Eindhoven, Netherlands

[73] Assignee: U.S. Philips Corporation, New York, N.Y.

[21] Appl. No.: 08/757,529

[22] Filed: Nov. 27, 1996

[30] Foreign Application Priority Data

Dec. 1, 1995 [EP] European Pat. Off. ............. 95203313

[51] Int. Cl.⁶ ................................................ H04N 7/10
[52] U.S. Cl. ................................ 395/873; 348/7; 395/826
[58] Field of Search ................................ 370/486, 487;
395/848, 185, 856, 200.47–200.48, 873,
872, 878, 880, 825; 346/7; 711/150, 151,
152, 153, 111–113, 167–168

[56] References Cited

U.S. PATENT DOCUMENTS

| | | | |
|---|---|---|---|
| 5,497,501 | 3/1996 | Kohzono et al. | 395/842 |
| 5,592,612 | 1/1997 | Birk | 348/7 |
| 5,594,923 | 1/1997 | Inou et al. | 395/842 |
| 5,606,359 | 2/1997 | Youden et al. | 348/7 |
| 5,631,693 | 5/1997 | Wunderlich et al. | 348/6 |
| 5,640,519 | 6/1997 | Langendorf et al. | 395/291 |
| 5,652,614 | 7/1997 | Okabayashi | 348/7 |
| 5,701,582 | 12/1997 | Debey et al. | 348/17 |
| 5,712,976 | 1/1998 | Falcon et al. | 395/200.61 |
| 5,724,539 | 3/1998 | Riggle et al. | 370/477 |

OTHER PUBLICATIONS

"I/O Issues in a Multimedia System", A.L. Narasimha Reddy and James C. Wyllie, IBM Almaden Research Center, Mar. 1994, pp. 69–74.

*Primary Examiner*—Andrew I. Faile
*Assistant Examiner*—Reuben M. Brown
*Attorney, Agent, or Firm*—Gregory L. Thorne

[57] ABSTRACT

A system, such as for example, a video server in a multimedia system, delivers data to a number of users, each of which may have a variable consumption rate. The system reads data blocks from the storage medium in successive sweeps and places the data in user buffers. The system in accordance with the invention reads, for a given user, one block of data from the storage medium no more than every other sweep, so that the duration of a sweep is shorter. Thus, whether a user needs data is checked more frequently and fewer data need be stored in the buffer of the user. As a result, the size of the buffer may be smaller.

12 Claims, 2 Drawing Sheets

METHOD AND SYSTEM FOR READING DATA FOR A NUMBER OF USERS

BACKGROUND OF THE INVENTION

1. Field of the Invention

The invention relates to a method for the presentation of data from a storage medium for consumption by two or more users, in which method blocks of data for the user are read from the storage medium and stored in buffers of the users in successive sweeps.

The invention also relates to a system for the presentation of data from a storage medium for consumption by two or more users, which system includes a read module for reading data blocks for the user from the storage medium and for placing these blocks in buffers of the users in successive sweeps.

2. Description of the Related Art

A method and a system of this kind are known in relation to a video server, for example as described in "I/O Issues in a Multimedia System", A. L. N. Reddy and J. C. Wyllie, Computer, IEEE, March 1994, pp. 69–74. The known system includes a disc on which a number of films is stored. The system simultaneously serves a number of users and includes for each user a buffer which serves to store data read from the disc and to present data to the user. A user must receive a continuous stream of data from the video server so as to ensure continuous reproduction of the film. During so-called sweeps the system periodically reads the data required from the disc, the duration of a period being so long that during such a period for each user a block of data can be read and placed in the relevant buffer. The size of a data block is such that it contains an adequate amount of data for the relevant user for the duration of one period. In a system involving, as opposed to the known system, users which consume data from their buffers at a fixed consumption rate, the period for reading data from the disc is synchronous with the presentation of data from the buffer to the user. At the end of a period the presentation of data commences from a recently filled buffer for each user. Such a system involving users with a fixed consumption rate, therefore, does not require more than one buffer in which two blocks of data can be stored per user. In the known system, however, the consumption rate of each of the users is variable up to a given, individual maximum consumption rate. Consequently, users can reach the end of a supplied data block at mutually different instants so as to start with a new data block. The period for reading data from the disc can then no longer be synchronized with the reading of data from the buffer by the user. In that case a next sweep commences as soon as the instantaneous sweep has been completed. As a result, the strictly periodic nature of the reading of data is lost. In order to ensure a continuous stream of data to the user also in these circumstances, the known system requires a buffer in which three blocks of data can be stored for each user. It is a drawback of the known method and the known system that a comparatively large amount of storage space is required for the user buffers.

SUMMARY OF THE INVENTION

It is inter alia an object of the invention to provide a method of the kind set forth which requires less storage space for the user buffer than the known method. To achieve this, the method in accordance with the invention is characterized in that from the users for which no block of data has been read during the directly preceding predetermined number of k minus 1 sweeps there is determined, on the basis of the filling degree of the relevant buffers, a group of users for which a block of data must be read in an instantaneous sweep, and that during the instantaneous sweep a respective block of data is read for each of the users of this group, each respective block containing enough data for consumption by the relevant user for that users predetermined maximum consumption rate for the maximum duration of a predetermined number of k successive sweeps.

It is a further object of the invention to provide a system of the kind set forth which requires less storage space for the user buffer than the known system. To this end, the system in accordance with the invention is characterized in that the read module is arranged to determine, on the basis of the filling degree of the relevant buffers, a group of users, from the users for which no block of data has been read during the directly preceding predetermined number of k minus 1 sweeps, for which a block of data must be read during an instantaneous sweep, and that the read module is also arranged to read a respective block of data for each of the users of this group during the instantaneous sweep, each respective data block containing enough data for consumption by the relevant user for that users predetermined maximum consumption rate for the maximum duration of a predetermined number of k successive sweeps.

In the method in accordance with the invention, for a user, no more than one data block is read from the storage medium per k sweeps. This means that the maximum duration of k successive sweeps together is so long that, distributed between the k successive sweeps, a data block can be read and placed in the relevant buffers for all users. This maximum duration, however, is substantially equal to the duration of one period with one sweep in the known system, because in both systems it must be possible to fetch a block for all users during that period. Consequently, the blocks in the two systems are of substantially the same size for corresponding users. The invention offers the advantage that on average the sweep duration is substantially shorter, so that on average it is checked much more often whether a buffer of a given user has not been depleted too far, so that a block of data can be read for this user, if necessary. As a result, in accordance with the invention fewer data need be stored in the user buffer. Consequently, this buffer can be chosen to be smaller so that less storage space is used.

A further advantage of the invention is that the interactive response time is improved. As opposed to normal reproduction of a video film, a user can explicitly request the system to supply a given block of data. This is, for example, the starting of a user or the jumping in a video film by a user. Such a request reaches the system at the instant of a given sweep and can be granted only upon the next sweep or the sweep after that. On average the user can start to consume the desired block after slightly more than one and a half sweeps. Because in accordance with the invention the duration of a single sweep is significantly shorter on average than in the known system, the user of the system in accordance with the invention can on average start to consume the block significantly sooner after a request.

An embodiment of the method in accordance with the invention relates to such a method in which the predetermined number k equals two. In this embodiment, for a user no more than one data block is read from the storage medium per two sweeps. Dividing the one original sweep into two successive sweeps is a simple method which has the advantage that the user buffer needs to be able to accommodate only two blocks of data rather than the three blocks according to the known method. As described above, the blocks in the method according to the invention have substantially the same size as the blocks according to the known method.

An embodiment of the system in accordance with the invention relates to such a system in which the read module is arranged to determine, for each of the relevant buffers, whether it has enough space available to receive the respective block of data. By using the invention it suffices that the buffer of a user can accommodate two blocks of data.

In an embodiment of the system in accordance with the invention the data includes digital video information. Digital video information requires a large amount of data and is presented to the user at a comparatively high speed. Consequently, a comparatively large buffer is required per user and the use of the invention offers a substantial saving in respect of storage space. Furthermore, the video information may be stored on the storage medium in various encoded forms, for example in MPEG-1 and in MPEG-2, which are presented to the user at a mutually different maximum rate.

In a general sense the invention is related to a video server as described in U.S. patent application Ser. No. . . . . , corresponding European Application . . . (PHN 15.480) in the name of applicant of the present application. In this system data blocks with a given mutual time difference concerning the information to be reproduced are stored in one segment.

In a general sense the invention is also related to a multimedia system for use in a video server as described in U.S. patent application Ser. No. 08/678,217, filed at WIPO under IB96/00655 in the name of applicant of the present application. In this system the data is stored in clusters, the part of the data at the end of a cluster being repeated at the beginning of the next cluster in order to achieve a shorter user response time.

In a general sense the invention is also related to a system for delivering films and interactive services to users as described in U.S. patent application Ser. No. . . . , filed at WIPO under IB96/00532 in the name of applicant of the present application. The system disclosed in the cited application enables the schedule of films and services to be offered to the users to be maintained in a simple and consistent manner.

BRIEF DESCRIPTION OF THE DRAWING

Further attractive embodiments of the method and the system in accordance with the invention are disclosed in dependent claims. The invention will be described in detail hereinafter, by way of example, with reference to the drawing; therein:

DETAILED DESCRIPTION OF THE PREFERRED EMBODIMENTS

Figure 1:
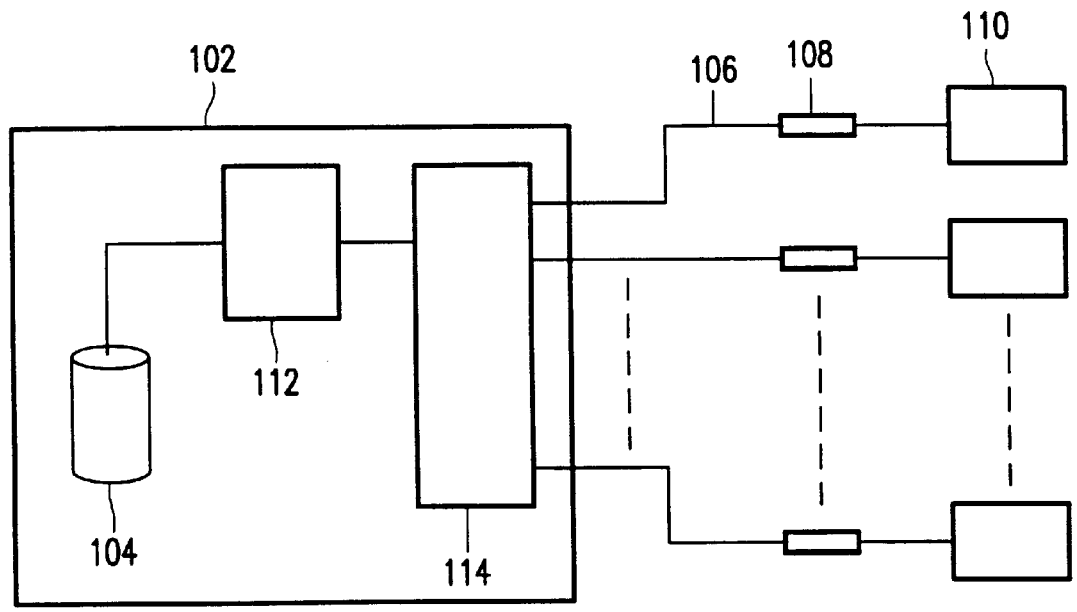
FIG. 1 shows diagrammatically a known system in which the invention can be used.

FIG. 1 shows diagrammatically a known system in which the invention can be used. It concerns a video-on-demand system with a video server 102 which delivers, upon request, user-specific video information to a number of users simultaneously. The video server includes a storage medium 104 on which a number of video films is stored in digital form. Because of the size and the number of films and the number of users to be simultaneously served, the storage medium is usually constructed as an array of magnetic discs as used also in large computer systems. The server delivers the video data, via a network connection 106, to a user terminal 108 for reproduction on a display screen 110. Various terminals such as 108 could be connected to the same network connection for the reception of the same information. Furthermore, various display screens such as 110 could be connected to one and the same terminal for the reproduction of the same images generated by the relevant terminal. The terminal 108 and the display screen 110 may also be integrated in one apparatus. When the reproduction of a given video film has started as requested by a given user, the server should send a continuous stream of video data to the relevant terminal. The server includes a read module 112 which periodically reads data blocks from the storage medium and places these blocks in the buffer module 114. From the buffer module 114 the video data is presented at a rate which suits the relevant user. During this presentation a next block is read for the user during a next period of the read module and is placed in the buffer module. A block contains an amount of video data which suffices to provide the user with data for the duration of a period of the read module.

In case the users have a fixed data consumption rate, it suffices when each user has a respective buffer in the buffer module, which buffer comprises two sections, each of which can accommodate one block of data. During a given period of the read module, video data is then presented to the user from one section of the buffer whereas the other section is prepared to receive the block of data read from the storage medium during said given period. When one section of the buffer is empty, presentation is switched over to the other section of the buffer and a next period commences during which a block will be read for the one section of the buffer. The video server has a fixed period and at the beginning of the period it is determined which blocks of data must be fetched; subsequently, during a so-called sweep the blocks of data are read from the storage medium and stored in the relevant buffers. The next period commences exactly at the instant at which the one section of the buffer of the users becomes empty and a change over takes place to the other section which has meanwhile been filled.

Figure 2:
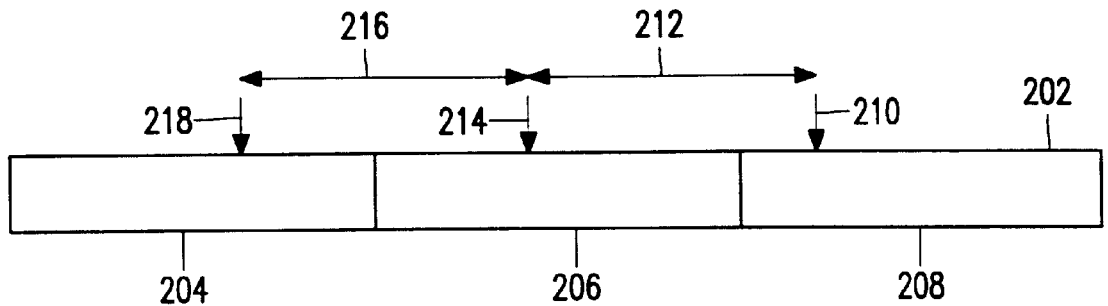
FIG. 2 shows a buffer in the known system with users having a variable consumption rate.

FIG. 2 shows a buffer in the known system involving users having a variable consumption rate. Because of the variable consumption rate, the presentation of data is no longer synchronized for the various users and it no longer holds that at the beginning of a sweep each user starts exactly in a filled section of his buffer. At the beginning of a sweep, therefore, the user consumption may have reached an arbitrary point in a section of the user buffer. As a result, it is no longer sufficient for the buffer in such a system to contain two data blocks; the buffer should rather be capable of accommodating three blocks. The buffer 202 includes the sections 204, 206 and 208, each of which can accommodate one block of data. A block contains an amount of data which suffices for the maximum duration of a sweep, being a sweep in which a block must be read from the disc for each user. The data is presented to the user from the buffer 202 by passing through the buffer at the desired speed and by placing the data on the relevant network connection. The instantaneous position during passage is updated by means of a pointer, it being assumed for the simplicity of FIG. 2 that the section of the buffer which is situated to the right of the pointer has meanwhile been vacated and that the section situated to the left of the pointer is still completely filled. At the beginning of a sweep it is checked whether a block of data must be read from the disc for the user of the buffer 202. If the pointer is in the section 208, for example in the position 210, a next block cannot be accommodated and, therefore, for this user no block will be read from the disc during this sweep. During this sweep a given amount of data, say 212, is consumed from the buffer. However, the consumption will never be more than the length of one block, because a block contains enough data for a sweep of maximum duration. At the beginning of the next sweep the pointer will be in the position 214 and it is deduced that a block must be read from the disc during said next sweep. During this sweep an amount 216 will be consumed from the buffer until the instant of arrival of a new block. However, the consumption again will not be more than one block. The pointer then reaches the position 218 and the buffer is filled in time. The organization of the buffer is more complex in reality than shown in FIG. 2, but that fact is not essential for explanation of the invention. This is because the buffer is cyclically traversed, the left-hand side and the right-hand side of FIG. 2 being linked. Furthermore, there is a consumption pointer which indicates how far consumption has progressed and also a filling pointer which indicates the location in which a block read from the disc can be stored in the buffer. The buffer is not empty for as long as the consumption pointer has not overtaken the filling pointer, and the buffer is not full for as long as the filling pointer has not overtaken the consumption pointer.

Figure 3:
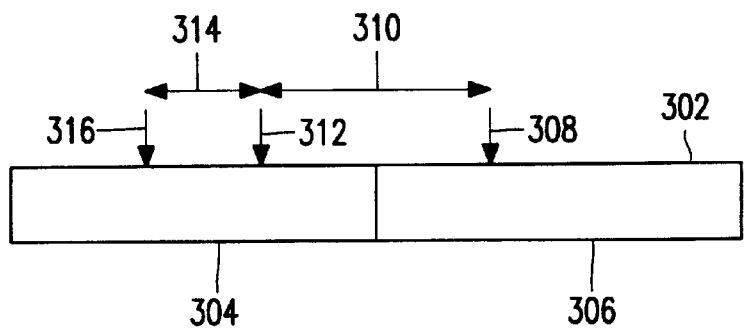
FIG. 3 shows a buffer in the system with users having a variable consumption rate in accordance with the invention.

FIG. 3 shows a buffer in the system involving users having a variable consumption rate in accordance with the invention. Buffer 302 includes a section 304 and a section 306, each of which can accommodate one block of data. In the system in accordance with the invention for a given user a block is read from the disc no more than once every other sweep. This means that during two successive sweeps for each user at the most one block of data must be read from the disc. The distribution of the blocks to be read between the two successive sweeps is not fixed. In one sweep it may be necessary to read a block for a large number of users, so that a block need be read for a few users only during the next sweep. The size of a block in the system in accordance with the invention suffices to comprise the amount of data required for the maximum duration of two successive sweeps. This maximum duration is the period time elapsing in order to read a block of data for each user, the blocks being equally distributed between two successive sweeps. The maximum duration of two successive sweeps in accordance with the invention is substantially equal to the maximum duration of one sweep in the known system, because in the latter case for all users a block must be read from the disc. The difference arises in that in accordance with the invention two sweeps are performed, so that an additional switch overhead of the read head for the disc is necessary. In the appendix a computation is given regarding the size of a block in the known system and the size of a block in the system in accordance with the invention. When the pointer indicating the instantaneous level of consumption is situated somewhere in section 306 in the buffer 302 at the beginning of a given sweep, for example in the position 308, no block of data can be read from the disc for this buffer during this given sweep. If an amount of data 310 is then consumed from the buffer during the given sweep, the pointer will be in the position 312 at the beginning of the next sweep. The buffer 302 satisfies both conditions to be satisfied for the reading of a block of data: no block has been read from the disc during the preceding sweep and space for a block of data is now available in the buffer. During the reading of a block from the disc, an amount 314 is consumed from the buffer and at the instant at which the block can be stored in the buffer, the pointer is in the position 316. In the example shown in FIG. 3, the user has consumed more data during the first sweep than during the second sweep, for example, because a block had to be read for more other users during the first sweep so that the duration of the sweep was longer. However, the sum of 310 and 314 will never be larger than one block, because in the system in accordance with the invention a block contains enough data for the maximum duration of two sweeps. On average, two successive sweeps will be shorter than the maximum duration, because the latter is based on a worst case situation for the reading of the blocks.

As a result of the invention, the capacity of the buffer of each of the users in a system with a variable consumption rate can remain limited to two blocks, whereas the known system requires a capacity of three blocks. The size of a block according to the invention is substantially equal to the size of a block in the known system. As a result, the invention offers a substantial saving in respect of storage space required by the user buffers. The invention can achieve this advantage because during the same period of time a substantially larger number of sweeps are performed than in the known system. Thus, it is more frequently checked whether a block must be read from the disc for a user and, consequently, less data need be stored in the buffer. The condition of the invention that no block may be read for a user in two successive sweeps does not restrict the normal operation of the server. This is because when a block has been fetched for a user, generally no space will be available for another block during the next sweep. This condition has an effect only when a user starts a session or when the user jumps to another part of the film. In those cases the user has enough space available to receive a data block twice in succession; however this is not permitted in order to keep the maximum duration of two successive sweeps short enough. It is to be noted, however, that in those cases the user can start consumption immediately at the end of the sweep in which the first block has been received and before the first block has been processed a new block will have been received during a further sweep.

Figure 4:
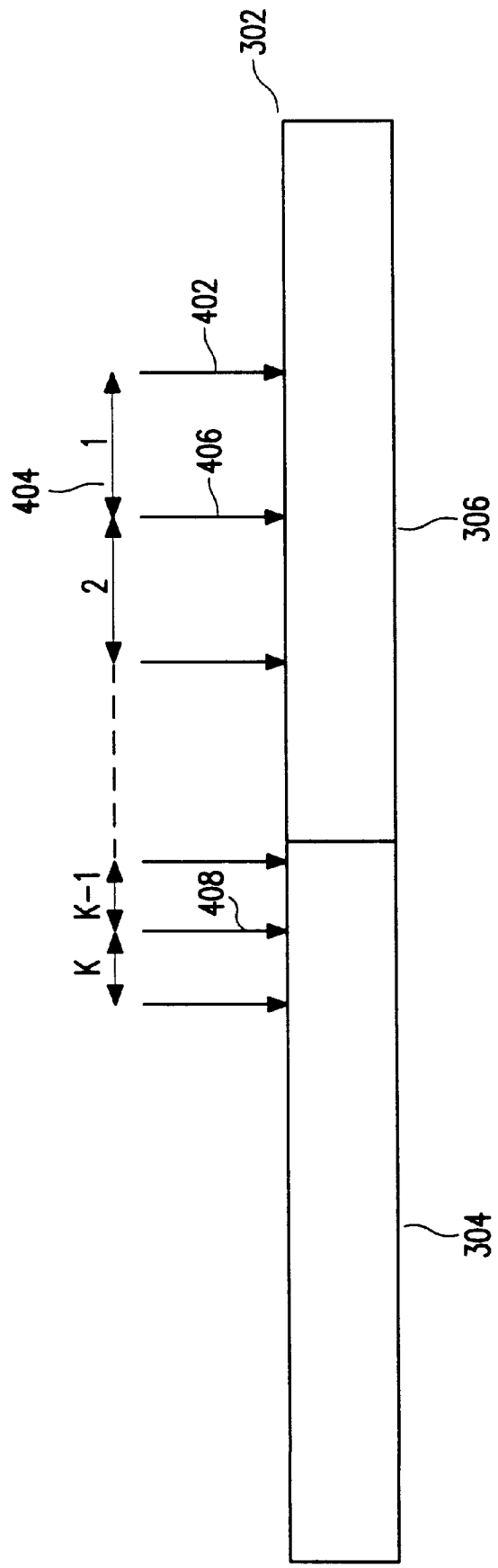
FIG. 4 shows a buffer in a generalized application of the invention.

FIG. 4 shows a buffer in a generalized application of the invention. In the embodiments of the invention described above, the one sweep of the known system has been divided into two shorter sweeps, whereby at most a block for every user is fetched in two of those shorter sweeps. However, according to the invention the one sweep can instead be divided into three or even more sweeps, thereby at most fetching a block for every user in three or more shorter sweeps. In general, the one sweep can be divided into k shorter sweeps, whereby for a particular user a block is fetched at most once every k sweeps. The buffer 302 comprises sections 304 and 306, each capable of holding one block of data. The size of a block of data in this general system suffices to comprise the amount of data required for the maximum duration of k successive sweeps. This maximum duration is the period time elapsing in order to read a block of data for each user, the blocks being equally distributed between the k successive sweeps. At a certain moment in time, a user has received a block in the previous sweep and the pointer indicating the instantaneous level of consumption is situated in position 402. Then the first sweep of a series of k sweeps for that user commences, in which first sweep the user consumes data 404 and in which no block is fetched for this user. When the second sweeps commences the pointer is in position 406 and again in this sweep, no block is fetched for this user. After k-1 sweeps, the pointer is situated in position and then it is determined whether a block of data should be fetched for the user in the next sweep k. There are two conditions that must be satisfied before a block of data is fetched: there must now be space available in the user buffer for a block of data and no block of data must have been fetched in the previous k-1 sweeps. Now, in the example indicated in FIG. 4, both conditions are satisfied at the moment the pointer is at position 408 and therefore a block of data is fetched for that user in sweep k. It is however very well possible that starting with the pointer in position 402, the sweeps will take less time and that after k-1 sweeps the pointer is still situated in section 306 of the buffer. Then no block is fetched for the user in sweep k, since there is no space available, and after sweep k it is again determined whether a block must be fetched. It is likely that it will take more than k sweeps to consume one block of data, because on average a sweep will be shorter than its calculated worst case period time. As described above, a block of data is sufficiently large to comprise the amount of data for the maximum duration of k sweeps.

The advantage of dividing the one sweep into more than two sweeps is that the individual sweeps will be shorter. This means that a new sweep is started more often and that an interactive, explicit request for a certain block can be granted quicker. So the interactive response time of a this embodiment with the further division of the sweep is even further improved compared with the embodiment with the division into two sweeps.

Appendix: Numeric example of block size and sweep time

In the below numeric example the prefix "k" is used for 1024 and the prefix "M" for 1048576 (i.e. 1024×1024). The example concerns the application of the invention, in which a user receives a block of data at most every other sweep. So the number k of the general case equals two.

Disc parameters

| Minimum data rate | $D_r$ | 4.69 Mbytes per second |
| --- | --- | --- |
| Latency (worst case) | $t_1$ | 11.16 ms |
| Number of tracks | $N_T$ | 4925 |
| Maximum seek time | $t_{s,max}$ | 25 ms |
| Minimum seek time | $t_{s,min}$ | 5.8 ms |

The actual seek time $t_s$ while traversing $n_T$ tracks is then given by:

$$t_s = t_{s,min} + (t_{s,max} - t_{s,min}) \cdot n_T/N_T$$

This formula represents a worst case approach which is substantially correct for values of $n_T$ which are not too small. The reading of a block of data from the disc requires at the most said period $t_s$ for moving the read head to the correct position plus at the most the latency time $t_1$ to await the passage of the correct point with data plus a given transfer time $T_r$ for actually reading the data. The transfer time for a block of size B follows from the formula:

$$T_r = B / D_r$$

Other system parameters

| Number of users | N | 16 |
| --- | --- | --- |
| Maximum consumption rate | $C_{max}$ | 1.6 Mbit per second |

Calculation for the known system

Let $T_s$ be the worst case time required to fetch 16 blocks in one sweep in the known system, a block for each user having a size $B_o$. The worst case situation then is the situation in which the blocks are situated 1/16 of the maximum number of tracks apart and that the latency time is maximum prior to the reading of each block. In this situation $n_T/N_T$ thus equals 1/16. The time $T_s$ required to read the 16 blocks then follows from the formula:

$$T_s = 16 \cdot (t_{s,min} + (t_{s,max} - t_{s,min})/16 + t_1 + B_o/D_r) \quad (1)$$

Furthermore, in this system it holds that a block is sufficiently large to contain data for the duration of one sweep, so in conformity with the formula:

$$B_o = T_s \cdot C_{max} \quad (2)$$

The following can be calculated from the formulas (1) and (2):
$T_s = 0.915$ s
$B_o = 187$ kbyte
The buffer for the user requires three of such blocks, so 562 kbyte. For the sixteen users this implies a buffer space of 8991 kbyte for the entire system.

Calculation for the system in accordance with the invention

In the system in accordance with the invention it must be possible to fetch 16 blocks in two sweeps within a period $T_{2s}$, a block has a size $B_n$ and it must be possible for the 16 read operations to be arbitrarily distributed between the sweeps. Because of the overhead at the disc the most unattractive distribution is that where in each sweep 8 blocks must be read which are situated a distance of 1/8 of the maximum number of tracks apart. In this most unattractive distribution, therefore, $n_T/N_T$ equals 1/8. The time $T_{2s}$ then required to read the 16 blocks follows from the formula:

$$T_{2s} = 16 \cdot (t_{s,min} + (t_{s,max} - t_{s,min})/8 + t_1 + B_n/D_r) \quad (3)$$

In this system it also holds that a block must be sufficiently large to contain data for the duration of two successive sweeps, so in conformity with the formula:

$$B_n = T_{2s} \cdot C_{max} \quad (4)$$

From the formulas (3) and (4) it can be calculated that:
$T_{2s} = 0.975$ s
$B_n = 200$ kbyte
The user buffer must be capable of storing two blocks and then has a size of 399 kbyte. The entire system with 16 users then requires a buffer space of 6390 kbyte.

Summary

The buffer space required for the known system and that required for the system in accordance with the invention has been calculated above. In both cases the worst case situation has been assumed for the reading of the data blocks from the disc. This is necessary to design such a system so that it satisfies the requirement that a user, once started, must receive a continuous stream of video data at all times. For the sake of the simplicity of this numeric sample it has been assumed that the system is small and involves no more than 16 users. In larger systems, however, data blocks are read in the same way and, therefore, advantages will be achieved in the same manner. As has been calculated, an advantage of 162.5 kbyte can be achieved per user buffer, implying a saving of 29%. A system involving 16 users can thus save a buffer storage space amounting to 2601 kbyte. In systems involving more users, the block size $B_n$ decreases to a limit value equal to the original value $B_o$. The saving of storage space in such a system then amounts to $33\frac{1}{3}\%$, i.e. for each user a reduction from a buffer capable of accommodating 3 blocks to a buffer capable of accommodating two blocks.

What is claimed is:

1. A method for the presentation of data from a storage medium for consumption by two or more users, said method comprising the steps of:

reading blocks of data for the users from the storage medium and storing in buffers of the users in successive sweeps;

from the users for which no block of data has been read during the directly preceding predetermined number of k minus 1 sweeps determining, on the basis of the filling degree of the relevant buffers, a group of users for which a block of data must be read in an instantaneous sweep; and during the instantaneous sweep, reading a respective block of data for each of the users of this group, each respective block containing enough data for consumption by the relevant user for that users predetermined maximum consumption rate for the maximum duration of the predetermined number of k successive sweeps, wherein for any one of the group of users, a block of data is read from the storage medium to more than once every other successive sweep.

2. A method as claimed in claim 1, in which the predetermined number k equals 2.

3. A method as claimed in claim 1, in when determining the group of users on the basis of the filling degree of the relevant buffers determining, for each respective buffer of the relevant buffers, whether the respective buffer has enough space available to receive the respective block of data.

4. A method as claimed in claim 1, in which the buffer of at least one of the users has a size which is substantially equal to and not smaller than the combined size of two blocks of data for this user.

5. A method as claimed in claim 1, in which the data includes digital video information.

6. A method as claimed in claim 1, in which the storage medium comprises a disc.

7. A system for the presentation of data from a storage medium for consumption by two or more users, said system comprising a read module for reading blocks of data for the users from the storage medium in successive sweeps and for storing blocks of data in buffers of the users, the read module being arranged to determine, on the basis of the filling degree of the relevant buffers, a group of users, from the users for which no block of data has been read during the directly preceding predetermined number of k minus 1 sweeps, for which a block of data must be read during an instantaneous sweep, and that the read module also being arranged to read a respective block of data for each of the users of this group during the instantaneous sweep, each respective block containing enough data for consumption by the relevant user for that users predetermined maximum consumption rate for the maximum duration of the predetermined number of k successive sweeps wherein for any one of the group of users, a block of data is read from the storage medium no more than once every other successive sweep.

8. A system as claimed in claim 7, in which the predetermined number k equals 2.

9. A system as claimed in claim 7, in which the read module is arranged to determine, for each of the relevant buffers, whether it has enough space available to receive the respective block of data.

10. A system as claimed in claim 7, in which the buffer of at least one of the users has a size which is substantially equal to and not smaller than the combined size of two blocks of data for this user.

11. A system as claimed in claim 7, in which the data includes digital video information.

12. A system as claimed in claim 7, in which the storage medium comprises a disc.

* * * * *